United States Patent [19]

Oda et al.

[11] 3,993,431
[45] Nov. 23, 1976

[54] APPARATUS FOR GENERATING HIGH-PRESSURE GAS

[75] Inventors: Noriyuki Oda; Takashi Yoshida; Takeshi Nakanishi; Kensuke Yoshikawa, all of Osaka, Japan

[73] Assignee: Hitachi Shipbuilding and Engineering Co., Ltd., Osaka, Japan

[22] Filed: Aug. 15, 1975

[21] Appl. No.: 604,976

[30] Foreign Application Priority Data

Oct. 9, 1974   Japan.............................. 49-116564

[52] U.S. Cl............................ 431/190; 60/39.46 R; 60/216; 431/158; 431/160
[51] Int. Cl.²......................................... F23L 7/00
[58] Field of Search.................... 431/158, 190, 160; 60/39.46, 216, DIG. 9

[56] References Cited

UNITED STATES PATENTS

| | | | |
|---|---|---|---|
| 3,101,592 | 8/1963 | Robertson et al. | 60/39.46 |
| 3,328,957 | 7/1967 | Rose | 60/39.46 |
| 3,771,313 | 11/1973 | Kaiho | 60/39.46 |

*Primary Examiner*—Edward G. Favors
*Attorney, Agent, or Firm*—Allison C. Collard

[57] ABSTRACT

High-pressure gas generating apparatus includes a combustion chamber and a water jacket surrounding the combustion chamber. A metal fuel injecting nozzle is disposed in the center of one end of the combustion chamber. The water in the jacket is injected into the combustion chamber in the form of a swirling stream around the fuel injected from the nozzle.

7 Claims, 4 Drawing Figures

APPARATUS FOR GENERATING HIGH-PRESSURE GAS

BACKGROUND OF THE INVENTION

This invention relates to an apparatus for generating a high-pressure gas, and more particularly to an apparatus by which a fuel mainly comprising lithium, magnesium, aluminum, boron or like light metal or a compound thereof is reacted in molten state with water by contact therewith to produce a high-temperature high-pressure combustion gas for use as driving energy for turbines or the like to propel self-propelling submarine bodies.

High pressure gas generating apparatus must have a high gas generating efficiency and must be so designed that the peripheral wall of the combustion chamber is prevented from overheating.

SUMMARY OF THE INVENTION

The present invention provides a high-pressure gas generating apparatus fulfilling the above-mentioned requirements and comprising a gas generator body including a combustion chamber and a water jacket surrounding the combustion chamber. The water to be reacted, which is introduced into the jacket before being injected into the combustion chamber, is heated with the heat of combustion reaction between a metal fuel and the water within the combustion chamber. The water is therefore preheated and then injected into the combustion chamber to ensure efficient combustion reaction. On the other hand, the peripheral wall of the combustion chamber is prevented from overheating by being cooled with the water in the jacket surrounding the combustion chamber. A metal fuel injecting nozzle is disposed in the center of one end of the combustion chamber, such that the water in the jacket is injected into the chamber in the form of a swirling stream around the fuel injected into the chamber from the nozzle. By virtue of a centrifugal force, accordingly, relatively large water droplets flow in the form of a film along the peripheral wall of the combustion chamber, thereby protecting the peripheral wall from the heat of combustion. The water droplets within the combustion chamber have progressively reducing sizes toward the center line of the chamber. This assures complete combustion reaction of the metal fuel with the water.

This invention will be described below in greater detail with reference to the accompanying drawings.

DESCRIPTION OF THE PREFERRED EMBODIMENT

Figure 1:
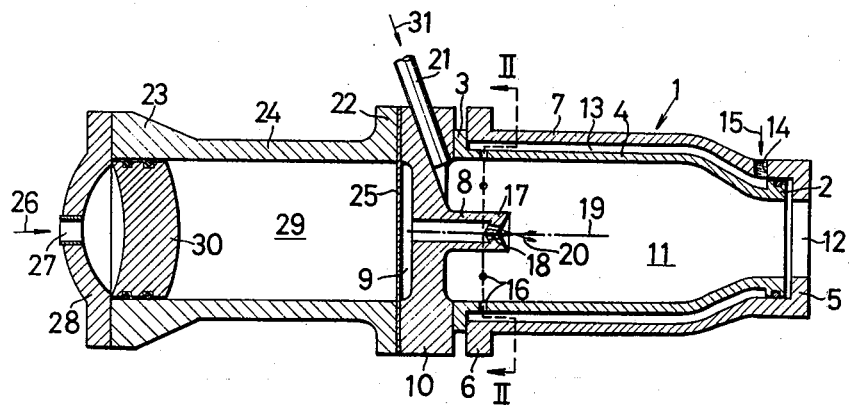
FIG. 1 is a view in vertical section showing a high-pressure gas generating apparatus according to this invention.

Throughout the specification and claims, the right-hand side of the drawing will be referred to as "front" and the left-hand side of the same as "rear."

Figure 2:
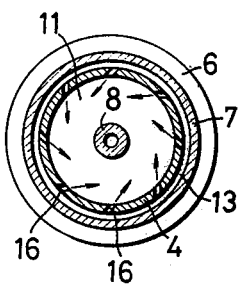
FIG. 2 is a view in section taken along the line II—II in FIG. 1.

With reference to FIGS. 1 and 2, a gas generator body 1 includes an inner tube 4 and an outer tube 7 surrounding the inner tube 4. The inner tube 4 has a front flange 2 and a rear flange 3 and includes a tapered front portion. The outer tube 7 has a front wall 5 and a rear end flange 6 and includes a tapered front portion like the inner tube 4. A closure disk 10 fitted to the rear end of the inner tube 4 has a metal fuel injecting nozzle 8 in the center of the disk and a recessed rear portion 9. The interior space defined by the inner tube 4 and the closure disk 10 serves as a combustion chamber 11. An opening having a diameter equal to the inner diameter of tapered front end of the inner tube 4 is formed in the center of front wall 5 of the outer tube 7 to provide a combustion gas outlet 12. Between the inner tube 4 and the outer tube 7 there is an annular clearance corresponding to the projection of the flange 2 of the former, and the space defined by the tubes 4, 7 and the flanges 2, 3 serves as a jacket 13 for the water to be reacted. The water jacket 13 thus surrounds the combustion chamber 11. The front end of the outer tube 7 has a water inlet 14 at a position to the rear of the flange 2. The water 15 to be reacted is forced into the jacket 13 through the inlet 14. A number of water orifices 16 formed in a rear end portion of the inner tube 4 are positioned slightly to the rear of the front end of the nozzle 8. The orifices 16 are arranged at a predetermined spacing as directed approximately tangentially of the inner tube 4. The jacket 13 communicates with the combustion chamber 11 through these orifices. As will be apparent from FIG. 2, the water 15 is injected from the orifices 16 in the form of a swirling stream. The nozzle 8 projects from the closure disk 10 into the combustion chamber 11 and has a recessed front end wall 17 having a V-shaped section. A plurality of orifices 18 formed in the front wall 17 are directed obliquely toward the center line extension 19 of the nozzle 8, so that the jets of a fuel 20 from the orifices 18 impinge against one another on the extension 19. Thus the fuel can be effectively made into fine particles. An initiator inlet tube 21 extends through the closure disk 10, with its front end exposed to the interior of the combustion chamber 11. A tube 24 having a front flange 22 and a rear flange 23 is mounted on the rear side of the closure disk 10, with a rupture disk 25 interposed between the disk 10 and the tube 24. The rupture disk 25 is made of a stainless steel sheet. The rear end of the tube 24 is covered with a rear closure 28 having in its center an inlet 27 for a pressure fluid 26. The portion of the closure 28 facing the interior of the tube 24 is recessed rearward in a concave shape. The space defined by the tube 24, closure disk 10 and closure 28 serves as a metal fuel storage chamber 29 to which the rear end of the nozzle 8 is open. A piston 30 forwardly curved or rounded in a convex shape is fitted in the rear end of the storage chamber 29. In normal state, the rupture disk 9 prevents transfer of the fuel from the storage chamber 29 to the combustion chamber 11 through the nozzle 8.

To initiate the apparatus of this invention into operation, an initiator 31 is introduced into the combustion chamber 11 through the tube 21 and is ignited by an unillustrated igniter. Usable as the initiator is hydrogen peroxide, a mixture of liquid oxide and liquid hydrogen, or the like. Also useful is an initiator, such as the decomposition product of concentrated hydrogen peroxide, which need not be ignited. When the initiator is burned within the combustion chamber 11, the water which has been filled in the jacket 13 is heated with the resulting heat. The water, upon being heated to a specified temperature, is injected into the combustion chamber 11 through the orifices 16 in the form of a swirling stream since the orifices 16 are directed substantially tangentially of the inner tube 4. At the same time, the pressure fluid 26 is applied to the rear of the piston 30 through the inlet 27. An inert gas or water is used as the pressure fluid 25. Before the application of the pressure fluid, the metal fuel within the storage chamber 29 has been rendered molten. When the high-pressure generating apparatus is employed in a self-propelling submarine body, there is the necessity of instantaneously melting the fuel. For this purpose, it is preferable to store a pelletized mixture of boron and potassium perchlorate and to ignite the mixture for heat generation. Of course, the means for melting the fuel is not limited to the above-mentioned example. As the piston 30 is pushed forward, the molten fuel ruptures the disk 25 first and is then injected from the nozzle 8 into the combustion chamber 11. The injected fuel reacts with the injected swirling water upon contact therewith and produces a high-temperature high-pressure combustion gas. The gas is discharged from the outlet 12 for use as energy to drive, for example, a turbine or the like.

After the initiation of operation, the water of a low temperature continuously forced into the jacket 13 through the inlet 14 is progressively heated with the heat of combustion within the combustion chamber 11 as it flows through the jacket 13 toward the orifices 16 and is forced out from the orifices 16 at a high temperature. On the other hand, the peripheral wall of the combustion chamber 11, namely the inner tube 4, is cooled with the water flowing through the jacket 13 and is thereby prevented from overheating.

Figure 3:
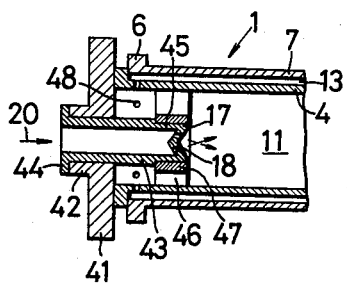
FIG. 3 is a fragmentary view in vertical section showing a modified embodiment of means for swirling and injecting the water to be reacted.
Figure 4:
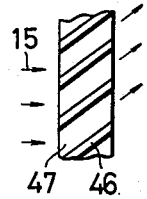
FIG. 4 is a fragmentary side elevation on an enlarged scale showing a swirler.

FIGS. 3 and 4 show a modified embodiment of the water swirling and injecting means. A closure disk 41 is provided in its center with a rearwardly extending tube 42, in which fittingly inserted a tubular nozzle 43 having a front wall 17 formed with a plurality of orifices 18. Thus the nozzle 43 extends through the closure disk 41 into the combustion chamber 11. A flange 44 on the rear end of the nozzle 43 bears against the rear end of the tube 42. The nozzle 43 has at its front end a stepped portion 45, to which is fixed a swirler 47 having a large number of blades 46 inclined with respect to the axis of the swirler. At a position between the swirler 47 and the closure disk 41, a large number of water orifices 48 are formed in the inner tube 4 at a predetermined spacing. The jacket 13 communicates with the combustion chamber 11 through the orifices 48. The parts shown in FIG. 3 and referred to by the same reference numerals as in FIGS. 1 and 2 are the same as those in the foregoing embodiment.

The water 15 injected from the orifices 48 for reaction is swirled by the blades 46 while flowing through the swirler 47.

What is claimed is:

1. An apparatus for generating a high pressure gas comprising a gas generator body including a combustion chamber and a water jacket surrounding the combustion chamber, a metal fuel injecting nozzle disposed in the center of one end of the combustion chamber, the metal fuel injecting nozzle projecting from a closure plate of the gas generator body into the combustion chamber and having a plurality of orifices formed in its front end directed obliquely with respect to the center line extension of the nozzle, and water swirling and injecting means for forcing out water from the jacket in the form of a swirling stream around an injected metal fuel.

2. An apparatus as defined in claim 1 wherein the water swirling and injecting means comprises a plurality of water orifices formed in the inner tube at a predetermined spacing and positioned near the nozzle, the water orifices being directed approximately tangentially of the inner tube, the water jacket communicating with the combustion chamber through the water orifices.

3. An apparatus as defined in claim 1 wherein the water swirling and injecting means comprises a swirler interposed between the front end outer suface of the nozzle and the inner tube and having a large number of blades inclined with respect to the axis thereof, and a plurality of water injecting orifices are formed in the inner tube and positioned at a predetermined spacing between the swirler and a closure plate of the gas generator body, the water jacket communicating with the combustion chamber through the water orifices.

4. An apparatus for generating a high-pressure gas comprising a gas generator body including a combustion chamber and a water jacket surrounding the combustion chamber and a metal fuel storage chamber connected to the combustion chamber with a closure plate interposed therebetween, the closure plate being provided in its center with a metal fuel injecting nozzle directed toward the combustion chamber and having one end open to the storage chamber.

5. An apparatus as defined in claim 4 wherein the storage chamber accommodates a fuel pressing piston.

6. An apparatus as defined in claim 4 wherein a rupture disk for preventing transfer of a metal fuel from the storage chamber to the combustion chamber extends over one end of the storage chamber.

7. An apparatus for generating a high pressure gas comprising a gas generator body including a combustion chamber and a water jacket surrounding the combustion chamber, said gas generator body comprising an inner tube and an outer tube defining the combustion chamber and the jacket, a metal fuel injecting nozzle disposed in the center of one end of the combustion chamber, a closure plate having said metal fuel injecting nozzle, the combustion chamber having an open end serving as a combustion gas outlet, the metal fuel injecting nozzle projecting from a closure plate of the gas generator body into the combustion chamber and having a plurality of orifices formed in its front end directed obliquely with respect to the center line extension of the nozzle, and water swirling and injecting means for forcing out water from the jacket in the form of a swirling stream around an injected metal fuel.

* * * * *